(12) United States Patent
Okabe et al.

(10) Patent No.: US 8,924,153 B2
(45) Date of Patent: Dec. 30, 2014

(54) NAVIGATION DEVICE, NAVIGATION METHOD, AND NAVIGATION PROGRAM

(75) Inventors: Hidefumi Okabe, Okazaki (JP); Yuji Sato, Owariasahi (JP)

(73) Assignee: Aisin Aw Co., Ltd., Aichi-ken (JP)

( * ) Notice: Subject to any disclaimer, the term of this patent is extended or adjusted under 35 U.S.C. 154(b) by 584 days.

(21) Appl. No.: 13/327,068

(22) Filed: Dec. 15, 2011

(65) Prior Publication Data

US 2012/0166083 A1   Jun. 28, 2012

(30) Foreign Application Priority Data

Dec. 28, 2010   (JP) .................................. 2010-292199

(51) Int. Cl.
*G01C 21/36* (2006.01)

(52) U.S. Cl.
CPC ........ *G01C 21/3655* (2013.01); *G01C 21/3602* (2013.01); *G01C 21/3644* (2013.01)
USPC .......................................... 701/518; 701/445

(58) Field of Classification Search
USPC ......................................................... 701/518
See application file for complete search history.

(56) References Cited

U.S. PATENT DOCUMENTS

| | | | |
|---|---|---|---|
| 5,410,486 A | | 4/1995 | Kishi et al. |
| 5,646,614 A | * | 7/1997 | Abersfelder et al. ....... 340/932.2 |
| 6,128,571 A | * | 10/2000 | Ito et al. ........................ 701/426 |
| 7,970,507 B2 | * | 6/2011 | Fregene et al. ................. 701/23 |
| 2005/0090977 A1 | * | 4/2005 | Takizawa ....................... 701/211 |
| 2008/0013802 A1 | * | 1/2008 | Lee et al. ....................... 382/118 |
| 2008/0166023 A1 | * | 7/2008 | Wang ............................. 382/107 |
| 2011/0025531 A1 | * | 2/2011 | Geelen et al. .............. 340/995.1 |

FOREIGN PATENT DOCUMENTS

| | | |
|---|---|---|
| CN | 101221049 A | 7/2008 |
| CN | 101281022 A | 10/2008 |
| EP | 0 782 118 A1 | 7/1997 |
| EP | 1 378 724 A1 | 1/2004 |
| JP | 2007-271568 A | 10/2007 |

OTHER PUBLICATIONS

European Search Report issued in European Application No. 11191943.7 dated May 7, 2012.

\* cited by examiner

*Primary Examiner* — Shelley Chen
(74) *Attorney, Agent, or Firm* — Sughrue Mion, PLLC (57) ABSTRACT

A navigation apparatus and method are provided. The navigation apparatus includes an image acquiring part that acquires an image of a road feature from a vehicle camera. The apparatus also includes a correction distance table that stores a correction distance to correct a difference between a position of a vehicle when the feature disappears from an imaging area of the camera and a guidance output reference position that is a position of the vehicle when the feature disappears from a driver's view. Further, a judging part is included and judges, based on the image acquired by the image acquiring part and the correction distance stored in the correction distance table, whether the vehicle has arrived at the guidance output reference position. Lastly, the apparatus includes a guidance part that provides guidance regarding the traffic light at a predetermined position having the guidance output reference position as a reference.

11 Claims, 9 Drawing Sheets

[CORRECTION DISTANCE TABLE OF FIRST EMBODIMENT]

| VEHICLE TYPE | CORRECTION DISTANCE |
|---|---|
| LIGHT CAR | 15m |
| SEDAN CAR | 13m |
| WAGON CAR | 10m |
| ... | ... |

[CORRECTION DISTANCE TABLE OF SECOND EMBODIMENT]

| VEHICLE TYPE | CORRECTION DISTANCE |
|---|---|
| LIGHT CAR | 5m |
| SEDAN CAR | 8m |
| WAGON CAR | 10m |
| ... | ... |

[CORRECTION DISTANCE TABLE OF THIRD EMBODIMENT]

| VEHICLE TYPE | TRAVEL SPEED | CORRECTION DISTANCE |
|---|---|---|
| LIGHT CAR | 0-20km/h | 12m |
| | 20-50km/h | 15m |
| | 50-80km/h | 20m |
| SEDAN CAR | 0-20km/h | 10m |
| | 20-50km/h | 13m |
| | 50-80km/h | 18m |
| WAGON CAR | 0-20km/h | 8m |
| | 20-50km/h | 10m |
| | 50-80km/h | 15m |
| ... | ... | ... |

FIG. 10

NAVIGATION DEVICE, NAVIGATION METHOD, AND NAVIGATION PROGRAM

INCORPORATION BY REFERENCE

This application claims priority from Japanese Patent Application No. 2010-292199, filed on Dec. 28, 2010, including the specification, drawings and abstract thereof, the disclosure of which is incorporated herein by reference in its entirety.

BACKGROUND OF THE INVENTION

1. Field of the Invention

Aspects of the present invention relate to a navigation device, a navigation method, and a navigation program.

Conventionally, navigation devices are used that store map information including road data, facility data, and the like, and provide guidance on a route based on the map information. For example, these navigation devices may determine a vehicle position on a map though map-matching between map data corresponding to a route and a current position detected by a current position detector and provide guidance based on the determined vehicle position.

However, in these navigation devices, guidance may be provided at a point a few dozens of meters before the point where the guidance should be provided because of an error between the current position detected by the current position detector and the actual vehicle position. Additionally, the guidance may be provided after the point where the guidance should be provided has been passed.

To solve these problems, a vehicle position recognizing device is disclosed, which performs an image recognition processing of a target feature included in image information acquired by an image-capturing device, which is mounted in the vehicle. This device corrects vehicle position information acquired by GPS signals by matching between the result of the image recognition and feature information of the target feature previously stored in a database, and provides guidance based on the corrected vehicle position information (refer to Japanese Patent Application; Publication No. JP-A-2007-271568).

SUMMARY OF THE INVENTION

However, in the conventional vehicle position recognizing devices as described above, it can be difficult to provide guidance to the driver at an appropriate time because a gap occurs between the image captured by the image-capturing device and the image that the driver of the vehicle sees, which is caused by a difference between the field angle of the image-capturing device and the view angle of the driver of the vehicle. For example, when the guidance is provided at the time when the target feature has disappeared from the imaging area of the image-capturing device, if the field angle of the image-capturing device is narrower than the view angle of the driver, the guidance will be provided even when the target feature is still in the driver's view, which gives the driver an uncomfortable feeling.

In light of the above-mentioned problems, it is an aspect of the present invention to provide a navigation device, a navigation method, and a navigation program that are capable of providing guidance to the driver of the vehicle at an appropriate time.

To solve the aforementioned problems, the present invention provides a navigation device described in a first aspect of the present invention including: an image acquiring unit that acquires an image from an image-capturing unit, which is mounted in a vehicle to capture an image of a feature on a road; a correction distance storing unit that stores a correction distance to correct a difference between a first vehicle position, which is a position of the vehicle when the feature disappears from an imaging area of the image-capturing unit, and a second vehicle position, which is a position of the vehicle when the feature disappears from a driver's view, the correction distance being along a travel direction of the vehicle; a judging unit that judges based on the image acquired by the image acquiring unit and the correction distance stored in the correction distance storing unit whether the vehicle has arrived at the second vehicle position; and a guidance unit that, if the judging unit has judged that the vehicle has arrived at the second vehicle position, provides guidance regarding the feature at a predetermined position having the second vehicle position as a reference.

In the navigation device described in a second aspect of the present invention, the correction distance is a distance from the second vehicle position to a position of the feature, and the judging unit determines the position of the feature based on the image acquired by the image acquiring unit, and if the vehicle has arrived at a position by the correction distance before the determined position of the feature along the travel direction of the vehicle, judges that the vehicle has arrived at the second vehicle position.

In the navigation device described in a third aspect of the present invention, the correction distance is a distance from the first vehicle position to the second vehicle position, and the judging unit determines, based on the image acquired by the image acquiring unit, a position where the feature has disappeared from the imaging area of the image-capturing unit, and if the vehicle has arrived at a position by the correction distance ahead of the determined position along the travel direction of the vehicle, judges that the vehicle has arrived at the second vehicle position.

In the navigation device described in a fourth aspect of the present invention, the correction distance storing unit stores the correction distance according to a travel speed of the vehicle, and the judging unit determines the travel speed of the vehicle in a predetermined method, acquires the correction distance according to the determined travel speed from the correction distance storing unit, and performs judgment based on the acquired correction distance.

A navigation method described in a fifth aspect of the present invention includes the steps of: storing, in a storing unit, a correction distance to correct a difference between a first vehicle position, which is a position of a vehicle when a feature disappears from an imaging area of an image-capturing unit mounted in the vehicle to capture an image of the feature on a road, and a second vehicle position, which is a position of the vehicle when the feature disappears from a driver's view, the correction distance being along a travel direction of the vehicle; acquiring the image captured by the image-capturing unit; judging based on the image acquired at the image acquiring step and the correction distance acquired from the storing unit whether the vehicle has arrived at the second vehicle position; and if it has been judged at the judging step that the vehicle has arrived at the second vehicle position, providing guidance regarding the feature at a predetermined position having the second vehicle position as a reference. The method according to the fifth aspect may further comprise determining the position of the feature based on the image acquired by the image acquiring unit, and if the vehicle has arrived at a position by the correction distance before the determined position of the feature along the travel direction of the vehicle, judging that the vehicle has arrived at the second vehicle position, wherein the correction distance is a distance from the second vehicle position to a position of the feature. Alternatively, the method according to the fifth aspect may further comprise determining, based on the image acquired by the image acquiring unit, a position where the feature has disappeared from the imaging area of the image-capturing unit, and if the vehicle has arrived at a position by the correction distance ahead of the determined position along the travel direction of the vehicle, judging that the vehicle has arrived at the second vehicle position, wherein the correction distance is a distance from the first vehicle position to the second vehicle position. Lastly, according to another alternative of the method of the fifth aspect may further comprise determining the travel speed of the vehicle in a predetermined method, acquiring the correction distance according to the determined travel speed from the correction distance storing unit, and performing judgment based on the acquired correction distance, wherein the correction distance storing unit stores the correction distance according to a travel speed of the vehicle.

A navigation program described in a sixth aspect of the present invention causes a computer to execute the method of the fifth aspect of the present invention.

According to the navigation device described in the first aspect of the present invention, the navigation method described in the fifth aspect of the present invention, and the navigation program described in the sixth aspect of the present invention, if the judging unit has judged that the vehicle has arrived at the second vehicle position, the guidance unit provides guidance regarding the feature at the predetermined position having the second vehicle position as a reference. Therefore, even if the field angle of the image-capturing unit and the view angle of the driver are different, the guidance can be provided based on the time when the feature disappears from the driver's view. Thereby, it is possible to provide the guidance to the driver at an appropriate time.

According to the navigation device described in the second aspect of the present invention, the correction distance is the distance from the second vehicle position to the position of the feature, and the judging unit determines the position of the feature based on the captured image acquired by the image acquiring unit, and if the vehicle has arrived at a position by the correction distance before the determined position of the feature along the travel direction of the vehicle, judges that the vehicle has arrived at the second vehicle position. Therefore, even if the vehicle is traveling the position well before the feature, the second vehicle position can be determined. Thereby, it is possible to provide the guidance to the user at a more appropriate time.

According to the navigation device described in the third aspect of the present invention, the correction distance is the distance from the first vehicle position to the second vehicle position, and the judging unit determines, based on the image acquired by the image acquiring unit, a position where the feature has disappeared from the imaging area of the image-capturing unit, and if the vehicle has arrived at a position by the correction distance ahead of the determined position along the travel direction of the vehicle, judges that the vehicle has arrived at the second vehicle position. Therefore, if the vehicle is traveling the position well before the feature and the image of the feature cannot be captured (for example, if the image of a distant feature cannot be captured because of a huge truck traveling ahead of the vehicle), the second vehicle position can be determined. Thereby, it is possible to provide the guidance to the driver at a more appropriate time.

According to the navigation device described in the fourth aspect of the present invention, the correction distance storing unit stores the correction distance according to the travel speed of the vehicle, and the judging unit determines the travel speed of the vehicle in a predetermined method, acquires the correction distance according to the determined travel speed from the correction distance storing unit, and performs judgment based on the acquired correction distance. Therefore, the second vehicle position can be determined in consideration of the influence that the travel speed makes on the view angle of the driver. Thereby, it is possible to provide the guidance to the driver at a more appropriate time.

BRIEF DESCRIPTION OF THE DRAWINGS

FIGS. 4A and 4B show a timing of guidance by the navigation device 1 according to the first embodiment.

FIGS. 7A and 7B show a timing of guidance by the navigation device 1 according to the second embodiment. FIG. 4B shows a situation where the vehicle has arrived at the guidance output reference position.

DETAILED DESCRIPTION OF THE EXEMPLARY EMBODIMENTS

A navigation device, a navigation method, and a navigation program according to the various aspects of the present invention are described in detail below with reference to embodiments in conjunction with the accompanying drawings. However, the present invention is not limited to the embodiments described below.

[First Embodiment]

In the first embodiment, guidance is provided at a predetermined position having, as a reference, a position by a correction distance before a position of a feature along a travel direction of a vehicle.

(Configuration)

Figure 1:
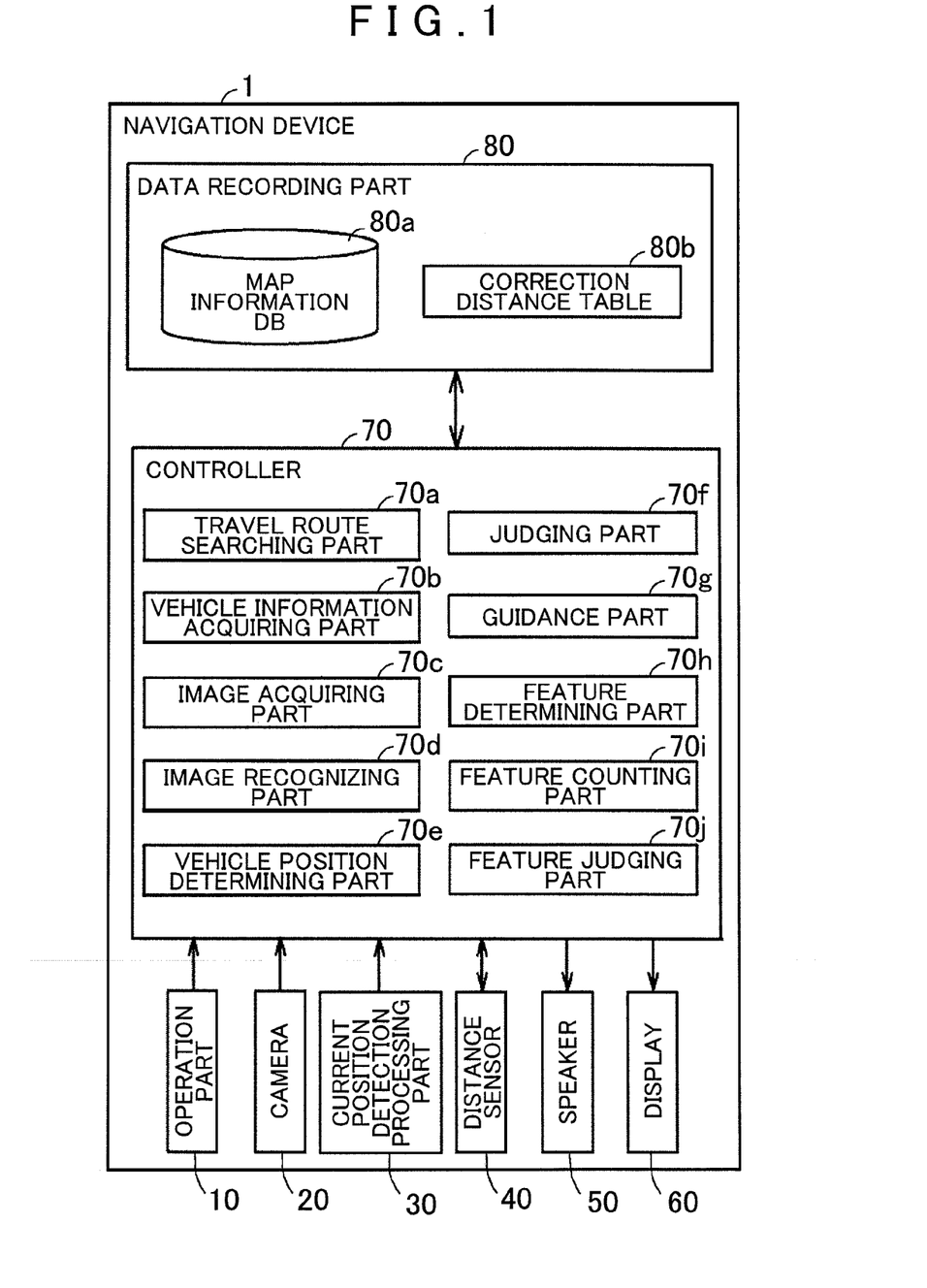
FIG. 1 is an exemplary block diagram of a navigation device 1 according to a first embodiment.

First, a configuration of the navigation device according to the first embodiment is explained. FIG. 1 is a block diagram illustrating a navigation device according the first embodiment. A navigation device 1 is mounted, for example, in a vehicle and provided with an operation part 10, a camera 20, a current position detection processing part 30, a distance sensor 40, a speaker 50, a display 60, a controller 70, and a data recording part 80, as shown in FIG. 1.

(Configuration—Operation Part)

The operation part 10 is an operation unit for receiving an input operated by a user. For example, the operation part 30 may comprise a touch panel provided on a front side of the display 60, a pressing button, a remote operation unit such as a remote controller, or a voice recognition unit such as a microphone that accepts an audio input.

(Configuration—Camera)

The camera 20 is an image-capturing unit, which is mounted in the vehicle to capture an image of a feature on a road. For example, the camera 20 may comprise a generally-known image-capturing device such as a CMOS image sensor, a CCD image sensor, and a generally-known optical part such as a fish-eye lens or a prism. The "feature" here includes, but is not limited to, a traffic light installed on a road. The "feature" may also include, for example, a sign post on a road, a pedestrian crossing, a notice on a building, and the like. Hereinafter, the explanation is given using the traffic light as an example of the "feature". FIG. 1 indicates that the camera 20 is a part of the navigation device 1. However, the camera 20 is not limited to this configuration, provided that it is mounted in a vehicle 2. For example, the camera 20 may be an external camera connected to the navigation device 1. The installation of the camera 20 will be described in detail later.

(Configuration—Current Position Detection Processing Part)

The current position detection processing part 30 is a current position detecting unit for detecting a current position of the vehicle mounted with the navigation device 1. Specifically, the current position detection processing part 20 includes at least one of a GPS (not shown), a geomagnetic sensor (not shown), and a gyro sensor (not shown), and detects a current vehicle position (a coordinate), an orientation, and the like in a known method.

(Configuration—Distance Sensor)

The distance sensor 40 detects a travel distance and a travel speed of the vehicle. For example, the distance sensor 40 may comprise a known pulse counter that outputs to the navigation device 1 a pulse signal every time a drive shaft, a wheel, or the like of the vehicle rotates by a predetermined amount.

(Configuration—Speaker)

The speaker 50 is an output unit for outputting various kinds of audio based on the control of the navigation device 1. The audio outputted by the speaker 50 is not limited to any specific type of audio format. For example, the audio may be a synthetic audio generated as needed or a previously recorded audio.

(Configuration—Display)

The display 60 is a display unit for displaying various kinds of images based on the control of the navigation device 1. The display 60 may comprise, for example, a known liquid crystal display or a flat panel display such as an organic EL display.

(Configuration—Controller)

The controller 70 is a control unit for controlling the navigation device 1, specifically a computer provided with a CPU, various kinds of programs recognized and executed on the CPU (including a basic control program such as an OS and an application program to be activated on the OS and realize specific functions), and an internal memory such as a RAM for storing the programs and various kinds of data. Particularly, a navigation program according to the present embodiment is installed in the navigation device 1 through an arbitrary recording medium or a network to substantially form respective parts of the controller 70.

The controller 70 is, in terms of a function concept, provided with a travel route searching part 70*a*, a vehicle information acquiring part 70*b*, an image acquiring part 70*c*, an image recognizing part 70*d*, a vehicle position determining part 70*e*, a judging part 70*f*, a guidance part 70*g*, a feature determining part 70*h*, a feature counting part 70*i*, and a feature judging part 70*j*. The travel route searching part 70*a* is a travel route searching unit for searching for a travel route from a departure point to a destination. The vehicle information acquiring part 70*b* is a vehicle information acquiring unit for acquiring information regarding a vehicle (hereinafter referred to as vehicle information). The "vehicle information" includes information determining a current position, a travel distance, a travel speed, and the like of the vehicle, for example. The image acquiring part 70*c* is an image acquiring unit for acquiring an image captured by the camera 20. The image recognizing part 70*d* is an image recognizing unit for executing a predetermined image processing on the image acquired by the image acquiring part 70*c* and recognizing a traffic light from the image. The vehicle position determining part 70*e* is a vehicle position determining unit for determining a guidance output reference position (a second vehicle position) based on the recognition result of the image recognizing part 70*d* and correction distance information stored in a correction distance table 80*b*, which is described later. The "guidance output reference position" represents a position of a vehicle when a traffic light ("feature") disappears from a driver's view of the vehicle. The judging part 70*f* is a judging unit for judging whether the vehicle has arrived at the guidance output reference position determined by the vehicle position determining part 70*e*. The guidance part 70*g* is a guidance unit for providing guidance regarding travel and the traffic light. The feature determining part 70*h* is a feature determining unit for determining the installed number of traffic lights on the travel route determined by the travel route searching part 70*a* from a map database (hereinafter the database is referred to as DB), which is described later. The feature counting part 70*i* is a feature counting unit for counting the number of traffic lights that the vehicle has passed through. The feature judging part 70*j* is a feature judging unit for judging whether the number of traffic lights counted by the feature counting part 70*i* matches with the installed number of traffic lights determined by the feature determining part 70*h*. The processing executed by the respective components of the controller 70 are described in detail later.

(Configuration—Data Recording Part)

The data recording part 80 is a recording unit for recording programs and various kinds of data necessary for the operation of the navigation device 1. For example, the data recording part 80 utilizes a hard disk (not shown) as an external storage device. However, in place of or in combination with the hard disk, other storage medium including a magnetic storage medium such as a magnetic disk or an optical storage medium such as a DVD and a Blu-ray disk can be utilized.

The data recording part 80 is provided with a map information DB 80*a* and the correction distance table 80*b*.

The map information DB 80*a* is a map information storing unit for storing map information. The "map information" includes for example link data (link numbers, connecting node numbers, road coordinates, road attributes, the number of lanes, driving regulation, and the like), node data (node numbers, coordinates), feature data (coordinates of traffic lights and the like), geographic data, map display data for displaying a map on the display 60, and the like.

Figure 2:
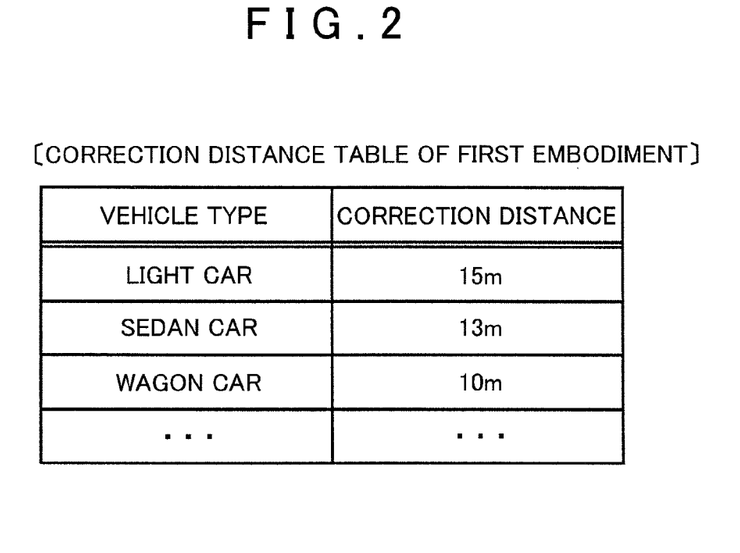
FIG. 2 illustrates contents of information stored in a correction distance table according to the first embodiment.

The correction distance table 80*b* is a correction distance storing unit for storing correction distance information, which is described later. FIG. 2 illustrates contents of information stored in the correction distance table 80*b* according to the first embodiment. As shown in FIG. 2, the correction distance table 80*b* stores information corresponding to table items "vehicle type" and "correction distance" in a correlated manner. The information to be stored corresponding to the item "vehicle type" is vehicle type determining information for determining a vehicle type, such as "sedan car", "light car", "wagon car", and the like. The information to be stored corresponding to the item "correction distance" is correction distance information regarding a correction distance, such as "15 m" and the like. Here, the "correction distance" is a distance set in order to correct the difference between the position of the vehicle (a first vehicle position) where a traffic light disappears from the imaging area of the camera 20 and the guidance output reference position. Specifically, the "correction distance" is the distance from the guidance output reference position to the position of the traffic light along the travel direction of the vehicle (hereinafter, referred to as a correction distance L2).

(Installed Position of Camera)

Figure 3:
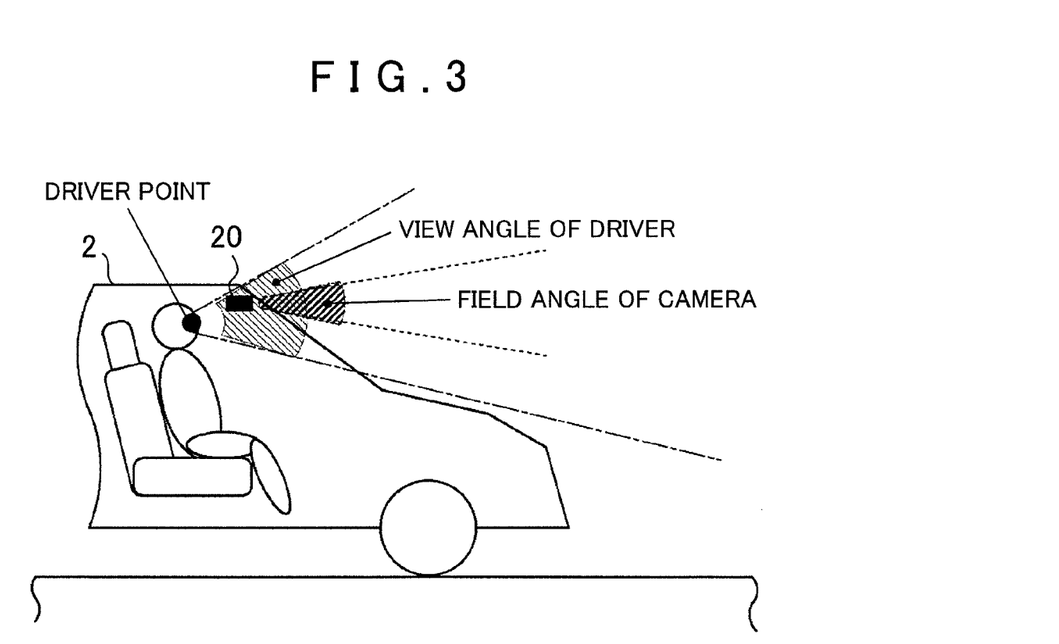
FIG. 3 shows an installed position of a camera.

Next, an installed position of the camera 20 is explained. FIG. 3 shows the installed position of the camera 20. As shown in FIG. 3, the camera 20 is installed around a front glass such that the camera 20 is facing ahead of the vehicle. In addition, the camera 20 is aligned such that the imaging area of the camera 20 is included in the driver's view when the field angle of the camera 20 is narrower than the view angle of the driver, for example. Here, the "driver's view" is a view that is determined using a driver point as a reference. For example, the "driver's view" corresponds to the view, which the driver can see when the position of a seat of the vehicle 2 is set at the very front, from the end of a roof to the lower end of the front glass of the vehicle, or the like. In addition, the "driver's point" is the position of the eyes of the driver and corresponds to the position of the eyes of the driver that is set based on a statistical standard physical type, or the like, for example. The installed position of the camera 20 is not limited to the above-mentioned position, but the camera 20 may be aligned, for example, at a position where the driver's view is included in the imaging area of the camera 20 if the field angle of the camera 20 is broader than the driver's view.

(Method)

Figure 4A:
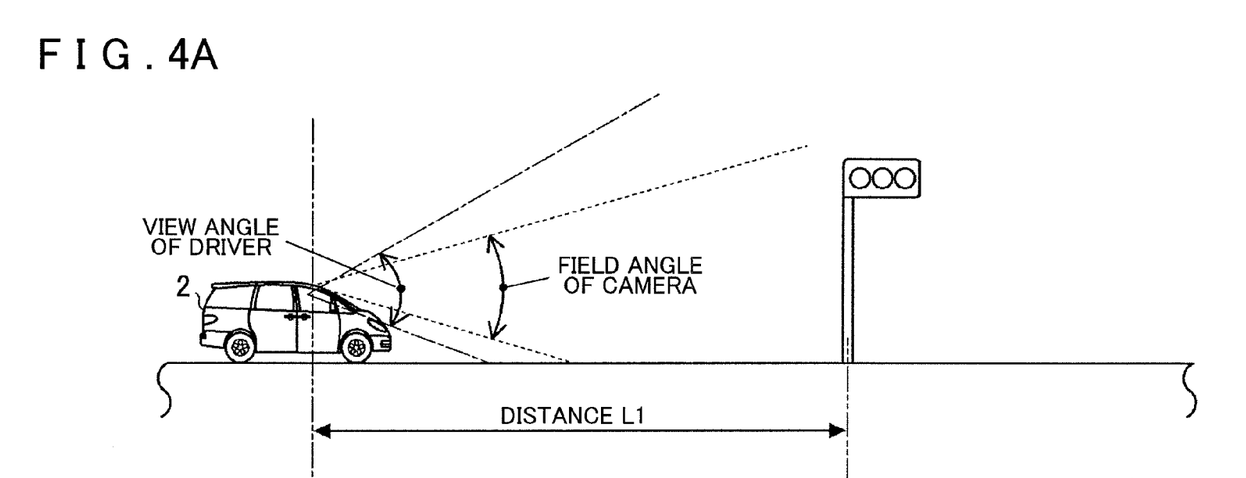
FIG. 4A shows a situation where a vehicle has arrived at a position where to capture an image of a traffic light.
Figure 4B:
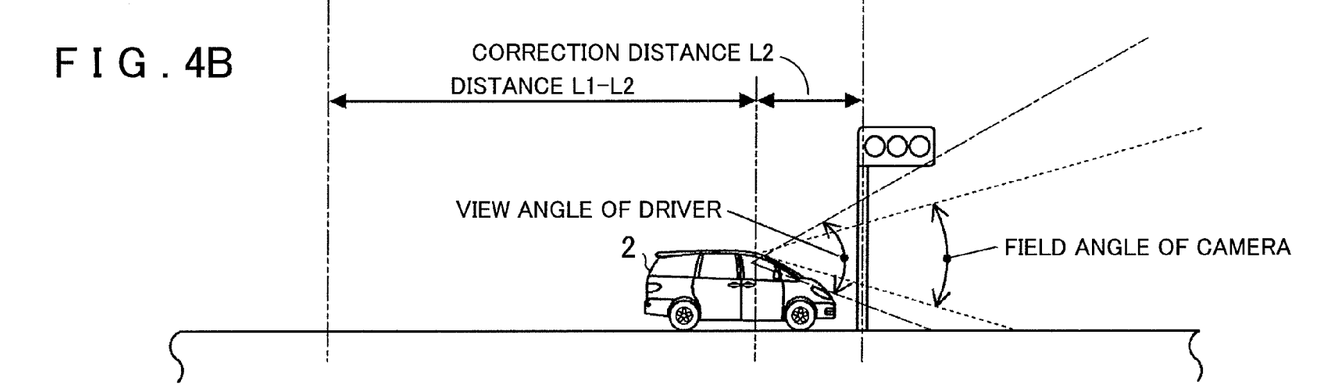
FIG. 4B shows a situation where the vehicle has arrived at a guidance output reference position.

Next, a guidance method of the navigation device 1 according to the first embodiment is explained. FIGS. 4A and 4B show the timing of the guidance by the navigation device 1 according to the first embodiment. FIG. 4A shows a situation where the vehicle 2 has arrived at the position where to capture an image of a traffic light. FIG. 4B shows a situation where the vehicle 2 has arrived at the guidance output reference position.

As shown in FIG. 4A, an image of a traffic light is captured with the camera 20 at an arbitrary position, which is a position before the installed position of the traffic light with respect to the travel direction of the vehicle 2 and where the traffic light is included in the imaging area of the camera 20. Next, the traffic light is recognized in the image through executing a predetermined image processing on the captured image, and a distance L1, from the position where the image of the traffic light has been captured to the installed position of the traffic light, is measured based on the recognition result. Subsequently, based on the correction distance information stored in the correction distance table 80b, a distance L1-L2 is calculated by subtracting a correction distance L2 from the measured L1. As shown in FIG. 4B, the guidance regarding the travel and/or the guidance regarding the traffic light is provided when the travel distance of the vehicle 2 has reached the distance L1-L2 from the position where the image of the traffic right has been captured.

(Processing)

Figure 5:
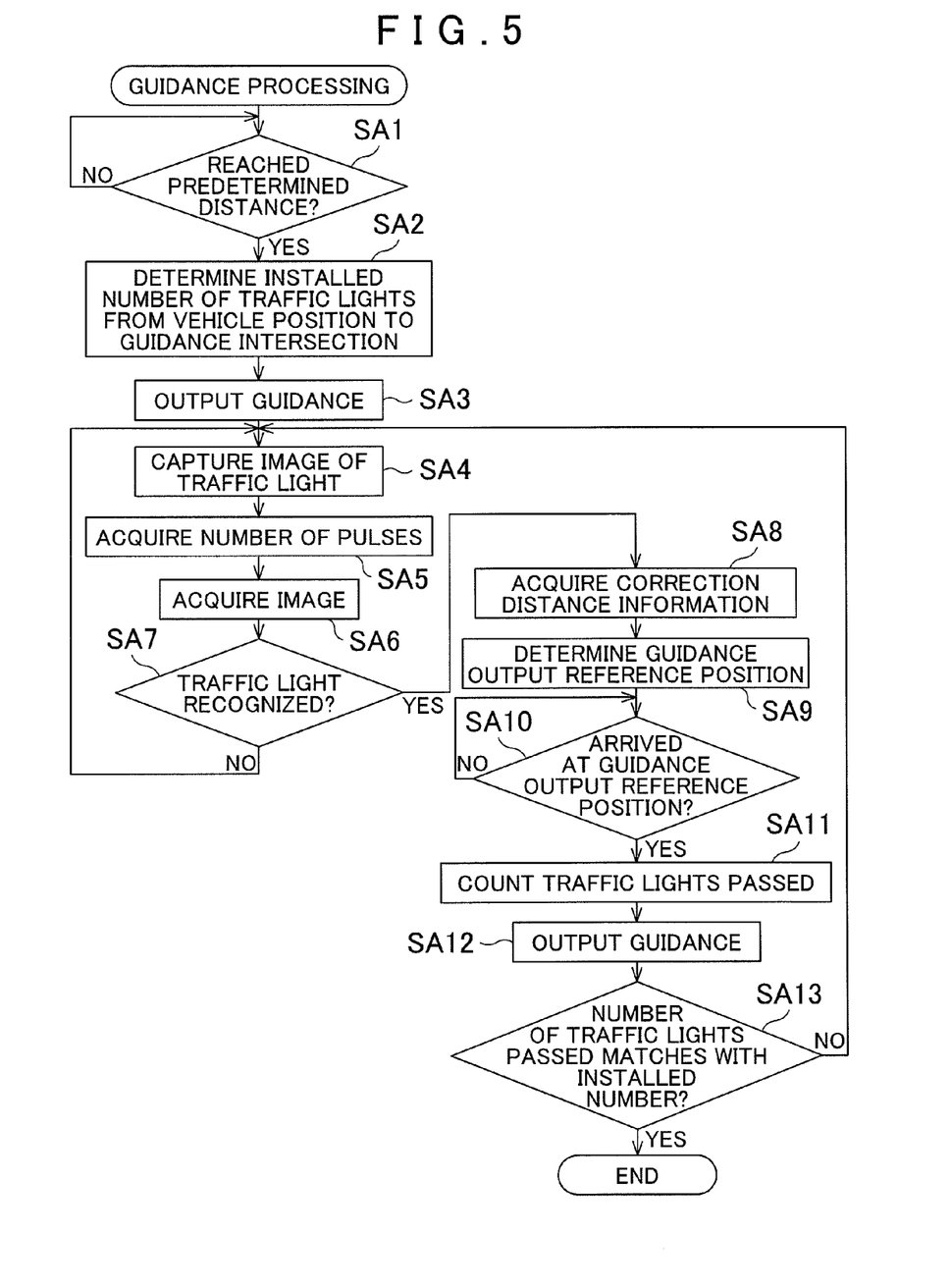
FIG. 5 is a flowchart of a guidance processing according to the first embodiment.

Next, guidance processing executed by the navigation device 1 according to the first embodiment is explained. FIG. 5 is a flowchart of the guidance processing according to the first embodiment (hereinafter, step is referred to as "S" in the explanation of the respective processing). The guidance processing is executed after the navigation device 1 is switched on, for example. In the following explanation, it is assumed that the travel route searching part 70a has determined the travel route based on the map information DB 80a before the vehicle 2 starts to travel.

As shown in FIG. 5, the controller 70 monitors based on the feature data stored in the map information DB 80a and the information regarding the travel route determined by the travel route searching part 70a whether the distance from the current position of the vehicle 2 to a guidance intersection has reached a predetermined distance (for example, 700 m) (SA1). The "guidance intersection" represents an intersection where the vehicle 2 makes a heading direction change along the travel route.

Here, if the distance from the current position of the vehicle 2 to the guidance intersection has reached the predetermined distance (SA1: YES), the feature determining part 70h determines traffic lights from the current vehicle position to the guidance intersection based on the information regarding the travel route determined by the travel route searching part 70a and the feature data stored in the map information DB 80a and counts the installed number of the determined traffic lights (SA2). In the explanation, the installed number of traffic lights is assumed to be three traffic lights.

Next, the guidance part 70g provides the guidance regarding the travel from the current vehicle position to the guidance intersection as well as the guidance regarding the installed number of the traffic lights counted at SA2 (SA3). For example, the guidance part 70g outputs with the speaker 50 an audio message including the travel distance from the current vehicle position to the guidance intersection along the travel direction of the vehicle 2, the heading direction, the installed number of traffic lights such as "About 700 m ahead, to the left direction at the third traffic light.", and the like. However, this guidance may be omitted.

Next, the controller 70 causes, based on the feature data stored in the map information DB 80a and the information regarding the travel route determined by the travel route searching part 70a, the camera 20 to capture the image of the traffic light located closest to the vehicle 2 among the traffic lights counted at SA2, at the position before the installed position of the traffic light closest to the vehicle 2 with respect to the travel direction of the vehicle 2, where the traffic light is included in the imaging area of the camera 2 (for example at the position of the vehicle 2 shown in FIG. 4A) (SA4). At the same time, the vehicle information acquiring part 70b acquires the number of pulses from the distance sensor 40 (SA5). The vehicle information acquiring part 70b continuously acquires the number of pulses from the distance sensor 40 till the vehicle 2 arrives at the guidance output reference position.

Subsequently, the image acquiring part 70c acquires the image captured at SA4 (SA6). Thereafter, the image recognizing part 70d performs the predetermined image processing on the image acquired by the image acquiring part 70c and judges whether the traffic light is recognized in the processed image (SA7). The specific logic of the recognition is arbitrary. For example, a luminance processing is performed on the captured image, in which the area having a distribution of luminance which matches with the luminance of the traffic light and having a distribution of luminance which matches with the shape of the traffic light is recognized as a traffic light.

If the traffic light is not recognized in the image processed by the image recognizing part 70*d* (SA7: NO), the controller 70 goes back to SA4 and repeats the capturing of the image of the traffic light and the processing of the image until the traffic light is recognized. If the controller 70 goes back to SA4, the vehicle information acquiring part 70*b* initializes the number of pulses acquired so far (the same is applied if it has been judged at SA10), which is described later, that the vehicle 2 has arrived at the guidance output reference position (SA10: YES).

On the other hand, if the traffic light is recognized in the image processed by the image recognizing part 70*d* (SA7: YES), the controller 70 acquires the correction distance information (for example 13 m in case of a sedan car) corresponding to the vehicle type information from the correction distance table 80*b* (SA8). The determination method of the vehicle type information is arbitrary. For example, the vehicle type information previously set by the driver through the operation part 10 is determined as the vehicle type information to be used at SA8.

Next, the vehicle position determining part 70*e* determines the guidance output reference position (for example, the position of the vehicle 2 shown in FIG. 4B) based on the recognition result at SA7 and the correction distance information acquired at SA8 (SA9). Specifically, the vehicle position determining part 70*e* measures the distance L1 from the position where the image of the traffic light was captured with the camera 20 to the installed position of the traffic light based on the recognition result at SA7 in a predetermined method. Subsequently, the vehicle position determining part 70*e* calculates the distance L1-L2 by subtracting the correction distance L2 from the measured distance L1 based on the correction distance information acquired at SA8. Thereafter, the vehicle position determining part 70*e* determines as the guidance output reference position the position that is by the distance L1-L2 along the travel direction of the vehicle 2 ahead of the position where the image of the traffic light was captured at SA4 (the position by the correction distance L2 before the position of the traffic light along the travel direction of vehicle 2).

Here, the specific measurement method of the distance L1 is arbitrary. For example, if the camera 20 is a stereo camera, the method of performing stereo matching toward the captured two images (for example, the method of performing matching by subtracting the luminance values of the two images), acquiring the disparity between the images, and measuring the distance to the traffic light is applied. Or, if the camera 20 is a monocular camera, the method of measuring the distance from the vehicle 2 to the traffic light based on a change in size of the image portion of the same traffic light in the images captured at, at least, two difference positions is applied.

Subsequently, the judging part 70*f* judges, based on the number of pulses acquired at SA5, whether the vehicle 2 has arrived at the guidance output reference position determined at SA9 (SA10). For example, if the accumulated number of pulses acquired at SA5 matches with the number of pulses corresponding to the distance L1-L2, the judging part 70*f* judges that the vehicle 2 has arrived at the guidance output position determined at SA9.

As a result, if it has been judged that the vehicle 2 has arrived at the guidance output reference position determined at SA9 (SA10: YES), the feature counting part 70*i* counts the number of traffic lights that the vehicle 2 has passed through (SA11). For example, if the vehicle 2 has passed through only the traffic light closest to the vehicle 2 with respect to the travel direction of the vehicle 2 among the three traffic lights acquired by calculating the number at SA2, the feature counting part 70*i* counts as "one" because the vehicle has passed through one traffic light.

Next, the guidance part 70*g* performs guidance regarding the travel (SA12). For example, the guidance part 70*g* outputs with the speaker 50 an audio message including the number of traffic lights counted at SA11 such as "Passed through the first traffic light.", and the like. However, the guidance output when the vehicle 2 has passed through the traffic light other than the traffic light installed at the guidance intersection may be omitted.

The feature judging part 70*j* judges whether the number of traffic lights counted at SA11 matches with the installed number of traffic lights calculated at SA2 (SA13). As a result, if it has been judged that the number of traffic lights counted at SA11 does not match with the installed number of traffic lights calculated at SA2 (SA13: NO), the controller 70 proceeds to SA4.

Next, after the processing from SA4 to SA9, when the vehicle 2 has arrived at the guidance output reference position determined at SA9 (SA10: YES), if the feature counting part 70*i* counts the number of traffic lights that the vehicle 2 passed through as "two" (SA11), the guidance part 70*g* provides guidance regarding the travel (SA12). For example, the guidance part 70*g* outputs with the speaker 50 an audio message including the travel distance from the current vehicle position to the guidance intersection along the travel direction of the vehicle 2, the heading direction, the number of traffic lights counted at SA11, such as "Passed through the second traffic light. About 200 m ahead, to the left direction at the next traffic light.", and the like.

Subsequently, the feature judging part 70*j* judges whether the number of traffic lights counted at SA11 matches with the installed number of traffic lights calculated at SA2 (SA13). As a result, if it has been judged that the number of traffic lights counted at SA11 does not match with the installed number of traffic lights calculated at SA2 (SA13: NO), the controller 70 proceeds to SA4.

Next, after the processing from SA4 to SA9, when the vehicle 2 has arrived at the guidance output reference position determined at SA9 (SA10: YES), if the feature counting part 70*i* counts the number of traffic lights that the vehicle 2 passed through as "three" (SA11), the guidance part 70*g* provides guidance regarding the travel (SA12). For example, the guidance part 70*g* outputs with the speaker 50 an audio message including the heading direction of the vehicle 2 such as "To the left.", and the like.

Subsequently, the feature judging part 70*j* judges whether the number of traffic lights counted at SA11 matches with the installed number of traffic lights calculated at SA2 (SA13). As a result, if it has been judged that the number of traffic lights counted at SA11 matches with the installed number of traffic lights calculated at SA2 (SA13: YES), the controller 70 terminates this processing.

(Effect)

According to the first embodiment, if the judging part 70*f* has judged that the vehicle 2 has arrived at the guidance output reference position, the guidance part 70*g* provides the guidance regarding the feature at a predetermined position having the guidance output reference position as a reference. Therefore, even if the field angle of the camera 20 differs from the view angle of the driver, the guidance can be provided based on the time when the traffic light disappears from the driver's view. Thereby, it is possible provide the guidance to the driver at a more appropriate time.

The correction distance L2 is the distance from the guidance output reference position to the position of the traffic light. The judging part 70f determines the position of the traffic light based on the image acquired by the image acquiring part 70c. If the vehicle 2 has arrived at the position by the correction distance L2 before the position of the determined traffic light along the travel direction of the vehicle 2, the judging part 70f judges that the vehicle 2 has arrived at the guidance output reference position. Therefore, even if the vehicle 2 is traveling the position well before the traffic light, it is possible to determine the guidance output reference position. Thereby, it is possible to provide the guidance to the driver at a more appropriate time.

[Second Embodiment]

Next, a second embodiment is explained. In this embodiment, the guidance is provided at a predetermined position having, as a reference, the position by the correction distance ahead of the position when the feature disappears from the imaging area of the image-capturing unit. The configuration of the second embodiment is the same as the configuration of the first embodiment if not otherwise specified. Therefore, the explanation is omitted by assigning the same signals and/or names as the ones used in the first embodiment as needed.

(Configuration—Data Recording Part)

Figure 6:
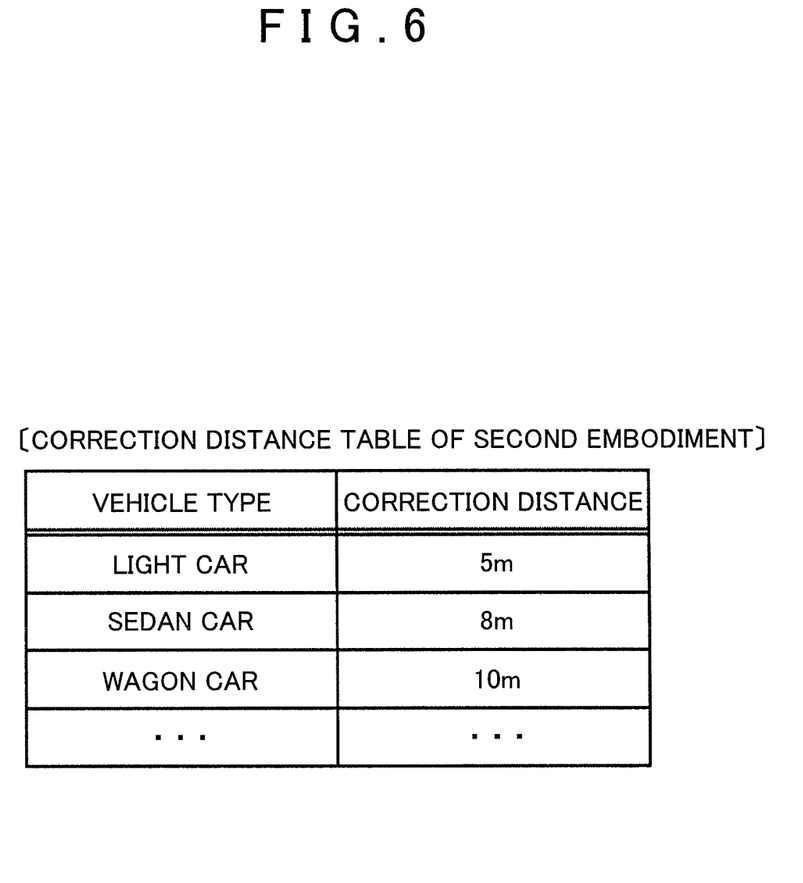
FIG. 6 illustrates contents of information stored in a correction distance table according to a second embodiment.

First, the configuration of the navigation device 1 according to the second embodiment is explained. The data recording part 80 is provided with the map information DB 80a and the correction distance table 80b. FIG. 6 illustrates contents of information stored in the correction distance table 80b according to the second embodiment. As shown in FIG. 6, the correction distance table 80b stores information corresponding to the table items "vehicle type" and "correction distance" in a correlated manner. The information to be stored corresponding to the item "vehicle type" is the same as the information corresponding to the same item in the correction distance table 80b shown in FIG. 2. The information to be stored corresponding to the item "correction distance" is the correction distance information regarding the correction distance, such as "5 m" and the like. Here, specifically, the "correction distance" is a distance (hereinafter, referred to as a correction distance L3) from the position of the vehicle 2 (hereinafter referred to as an imaging area disappearing position (a first vehicle position)) when the traffic light disappears from the imaging area of the camera 20 to the guidance output reference position along the travel direction of the vehicle 2.

(Method)

Figure 7A:
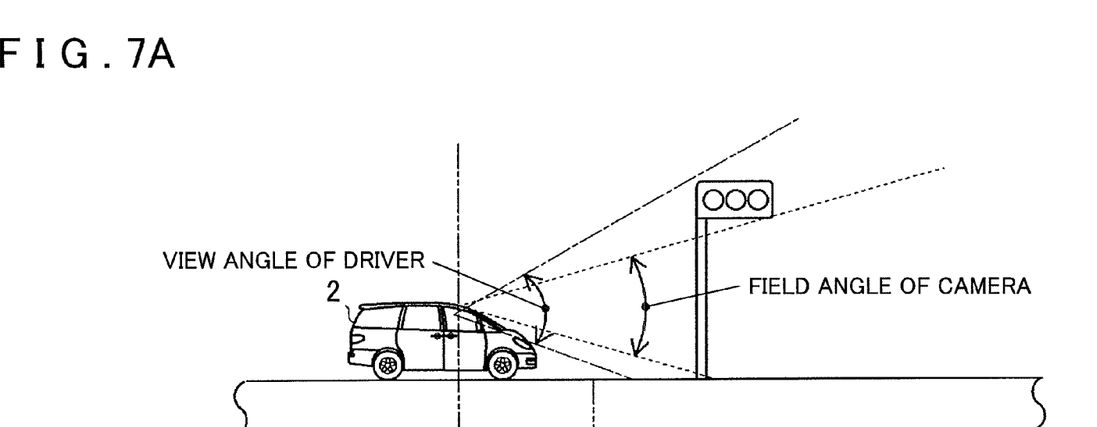
FIG. 7A shows a situation where the vehicle has arrived at an imaging area disappearing position.
Figure 7B:
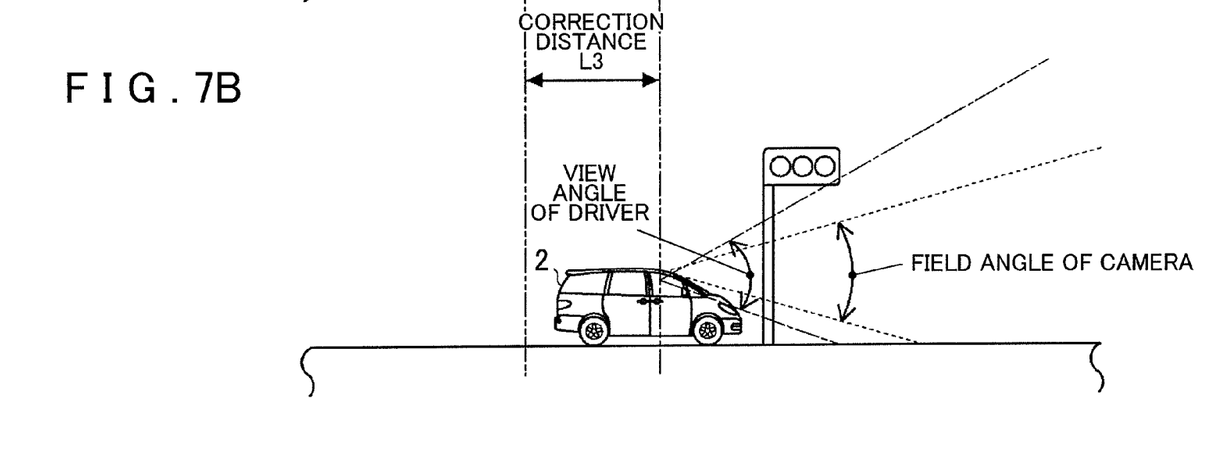

Next, a guidance method of the navigation device 1 according to the second embodiment is explained. FIGS. 7A and 7B show the timing of the guidance by the navigation device 1 according to the second embodiment. FIG. 7A shows a situation where the vehicle has arrived at the imaging area disappearing position. FIG. 7B shows a situation where the vehicle has arrived at the guidance output reference position.

As shown in FIG. 7A, the image of the traffic light is captured with the camera 20 at an arbitrary position, which is a position before the installed position of the traffic light with respect to the travel direction of the vehicle 2 and where the traffic light is included in the imaging area of the camera 20. Next, the presence or the absence of the traffic light is recognized in the image through executing a predetermined image processing on the captured image, and the position where the traffic light has disappeared from the captured image is determined as the imaging area disappearing position. Subsequently, based on the correction distance information stored in the correction distance table 80b, the correction distance L3 is acquired along the travel direction of the vehicle 2 from the imaging area disappearing position. As shown in FIG. 7B, the guidance regarding the travel and/or the guidance regarding the traffic light is provided when the travel distance of the vehicle 2 has reached the distance L3 from the imaging area disappearing position.

(Processing)

Figure 8:
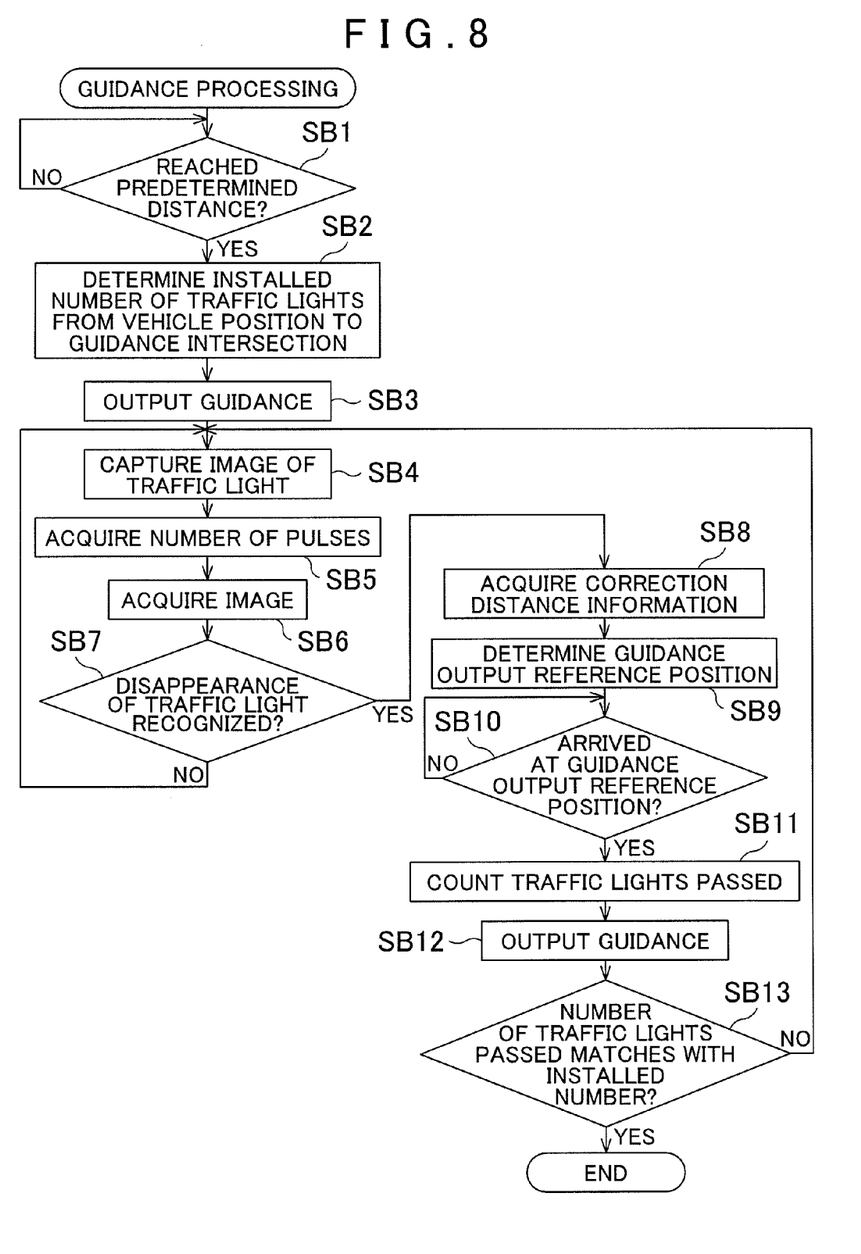
FIG. 8 is a flowchart of a guidance processing according to the second embodiment.

Next, the guidance processing executed by the navigation device 1 according to the second embodiment is explained. FIG. 8 is a flowchart of the guidance processing according to the second embodiment. Here, SB1 to SB6 and SB10 to SB13 in this guidance processing are the same as SA1 to SA6 and SA10 to SA13 in the processing of the first embodiment shown in FIG. 5. Therefore, the explanation is omitted.

After the processing at SB6, the image recognizing part 70d executes the predetermined image processing on the image acquired by the image acquiring part 70c, and judges whether it has been recognized that the traffic light has disappeared from the processed image (SB7). Here, if it has not been recognized that the traffic light has disappeared from the image processed by the image recognizing part 70d (SB7: NO), the controller 70 proceeds to SB4.

On the other hand, if it has been recognized that the traffic light has disappeared from the image processed by the image recognizing part 70d (SB7: YES), the controller 70 acquires the correction distance information from the correction distance table 80b (SB8). Next, the vehicle position determining part 70e determines the guidance output reference position (for example, the position of the vehicle 2 shown in FIG. 7B) based on the recognition result at SB7 and the correction distance information acquired at SB8 (SB9). Specifically, the vehicle position determining part 70e determines, based on the recognition result at SB7, the position where the traffic light has disappeared from the captured image as the imaging area disappearing position (for example, the position of the vehicle 2 shown in FIG. 7A). Thereafter, the vehicle position determining part 70e determines, as the guidance output reference position, the position by the correction distance L3 ahead of the imaging area disappearing position along the travel direction of the vehicle 2 based on the correction distance information acquired at SB8.

(Effect)

According to the second embodiment, the correction distance L3 is the distance from the imaging area disappearing position to the guidance output reference position. The judging part 70f determines the position where the traffic light has disappeared from the imaging area of the camera 20 based on the image acquired by the image acquiring part 70c. If the vehicle 2 has arrived at the position by the correction distance L3 ahead of the determined position along the travel direction of the vehicle 2, the judging part 70f judges that the vehicle 2 has arrived at the guidance output reference position. Therefore, if the vehicle 2 is traveling a position well before the traffic light and the image of the traffic light cannot be captured (for example, if the image of a distant traffic light cannot be captured because of a huge truck traveling ahead of the vehicle 2), the guidance output reference position can be determined. Thereby, it is possible to provide the guidance to the driver at a more appropriate time.

[Third Embodiment]

Next, a third embodiment is explained. In this embodiment, the correction distance according to the travel speed of the vehicle is used. The configuration of the third embodiment is the same as the configuration of the first embodiment if not otherwise specified. Therefore, the explanation is omitted by assigning the same signals and/or names as the ones used in the first embodiment as needed.

(Configuration—Data Recording Part)

Figure 9:
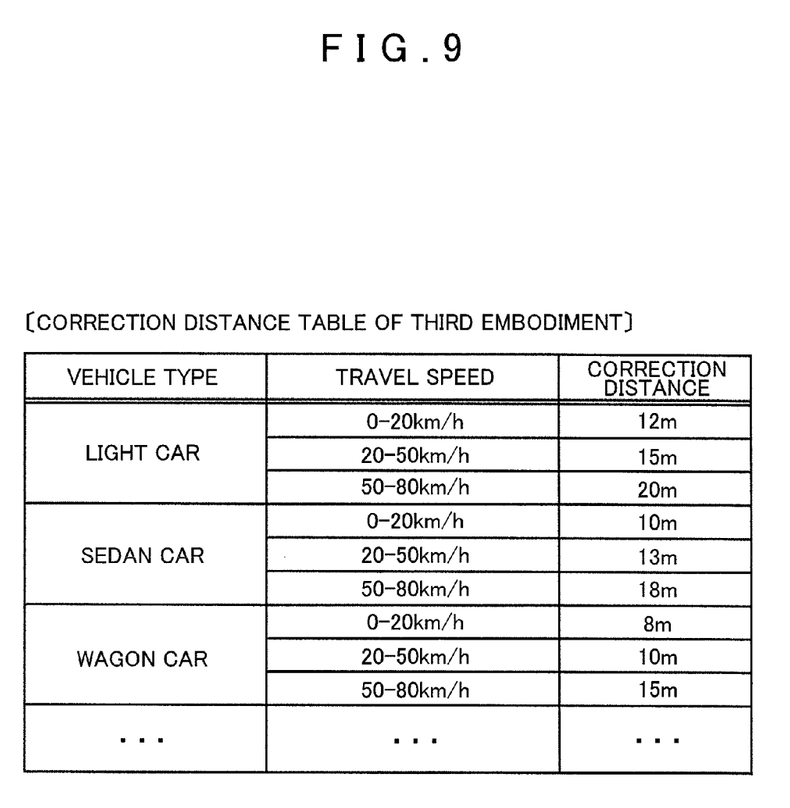
FIG. 9 illustrates contents of information stored in a correction distance table according to a third embodiment.

First, the configuration of the navigation device 1 according to the third embodiment is explained. The data recording part 80 is provided with the map information DB 80a and the correction distance table 80b. FIG. 9 illustrates contents of information stored in the correction distance table 80b according to the third embodiment. As shown in FIG. 9, the correction distance table 80b stores information corresponding to the table items "vehicle type", "travel speed", and "correction distance" in a correlated manner. The information to be stored corresponding to the item "vehicle type" is the same as the information corresponding to the same item in the correction distance table 80b shown in FIG. 2. The information to be stored corresponding to the item "travel speed" is travel speed determining information for determining the travel speed of the vehicle 2, such as "0-20 km/h" representing a travel speed range of 0 km/h or more but less than 20 km/h, and the like. The information to be stored corresponding to the item "correction distance" is the same information corresponding to the same item in the correction distance table 80b shown in FIG. 2.

(Processing)

Figure 10:
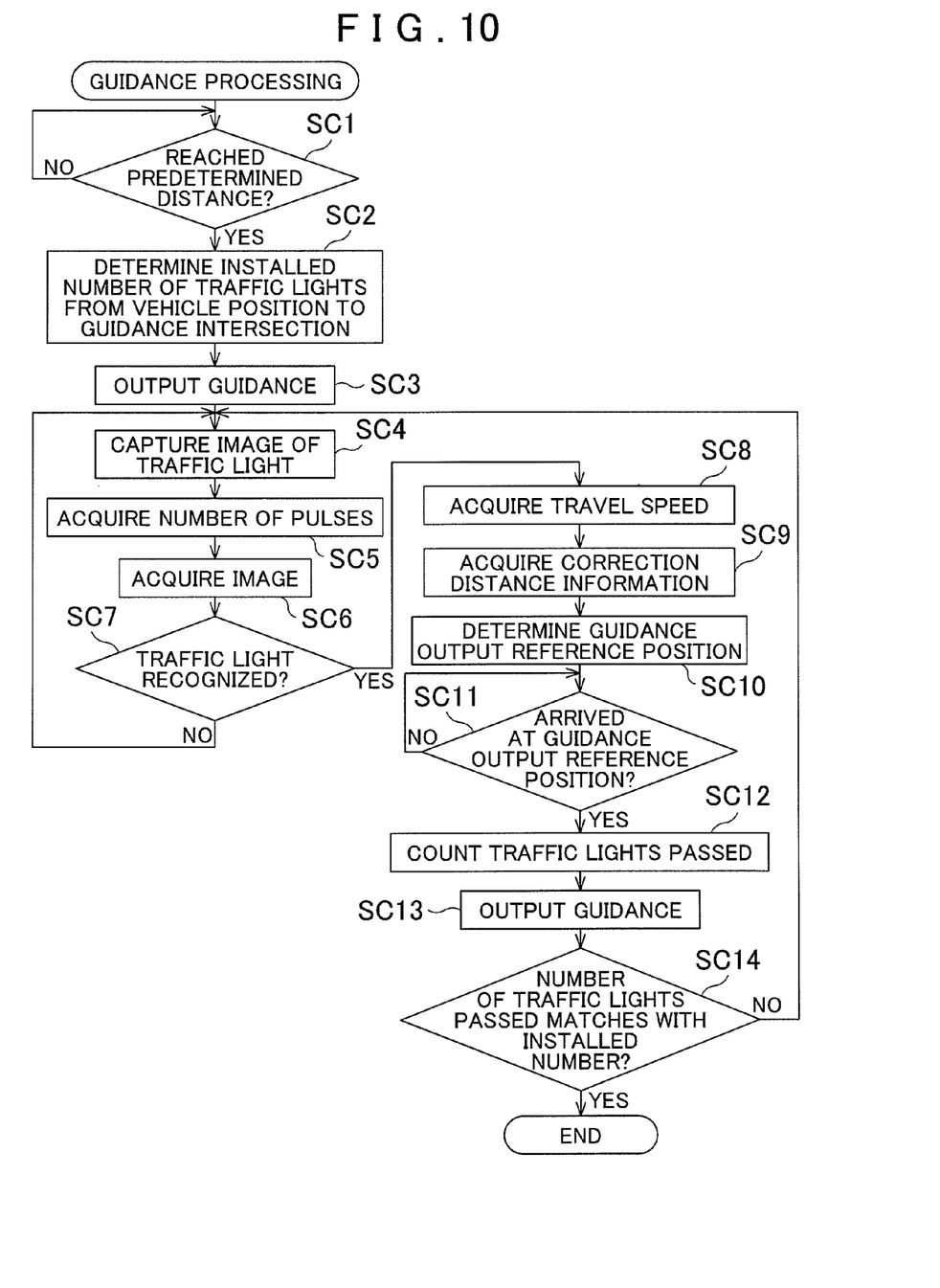
FIG. 10 is a flowchart of a guidance processing according to the third embodiment.

Next, the guidance processing executed by the navigation device 1 according to the third embodiment is explained. FIG. 10 is a flowchart of the guidance processing according to the third embodiment. Here, SC1 to SC6 and SC10 to SC14 in this guidance processing are the same as SA1 to SA6 and SA9 to SA13 in the processing of the first embodiment shown in FIG. 5. Therefore, the explanation is omitted.

In the processing at SC7, if the traffic light has been recognized in the image processed by the image recognizing part 70d (SC7: YES), the vehicle information acquiring part 70b acquires the travel speed of the vehicle 2 in a known method (SC8). Subsequently, the controller 70 acquires the correction distance information corresponding to the vehicle type information and corresponding to the travel speed of the vehicle 2 acquired at SC8 from the correction distance table 80b (for example, "18 m" if the vehicle 2 is a sedan car and the travel speed is 60 km/h) (SC9).

(Effect)

According to the third embodiment, the correction distance table 80b stores the correction distance L2 according to the travel speed of the vehicle 2. The judging part 70f determines the travel speed of the vehicle 2 in a predetermined method, acquires the correction distance L2 corresponding to the determined travel speed from the correction distance table 80b, and performs judgment based on the acquired correction distance L2. Therefore, the guidance output reference position can be determined in consideration of the influence that the travel speed makes on the view angle of the driver. Thereby, it is possible to provide the guidance to the driver at a more appropriate time.

Modification Examples for the Embodiment

While various features have been described in conjunction with the various embodiments of the present invention, various modifications and/or improvements may be made without departing from the broad spirit and scope of the underlying principles described in claims. Some examples of these alternatives are described below.

Problems to be Solved by the Invention and its Effects

Problems to be solved by the invention and effects of the invention are not limited to the contents described above, and may vary depending on the environment where the invention is executed and/or details of the configuration. Therefore, only a part of the problems described above may be solved, or only a part of the effects described above may be accomplished.

Combination of the Respective Embodiments

The configurations explained in the respective embodiments can be combined each other in an arbitrary manner. For example, in the third embodiment, a case was explained, in which the correction distance table storing the correction distance information according to the travel speed of the vehicle is applied to the first embodiment. However, this correction distance table may be applied to the second embodiment, for example.

The processing explained in the respective embodiments can be combined each other in an arbitrary manner. For example, the controller 70 acquires congestion information through a VICS (Vehicle Information and Communication System), an internet, or the like using a communication part (not shown); if the vehicle 2 is not caught in a congestion based on the acquired congestion information, the controller 70 may control to execute the guidance processing of the first embodiment; and if the vehicle 2 is caught in the congestion, the controller 70 may control to execute the guidance processing of the second embodiment.

(Correction Distance Information)

In the respective embodiments, it was explained that the correction distance information regarding the correction distance was stored in the correction distance table 80b. However, the configuration is not limited to the above. For example, the driver may set the correction distance through the operation part 10. Or, the correction distance may be set based on the measured result of a driver monitor camera. For example, the controller 70 causes the driver monitor camera (not shown) installed in the vehicle 2 to acquire a driver point of the driver and calculates the view angle of the driver based on the acquired driver point in a known method. Thereafter, the controller 70 calculates and sets the correction distance based on the calculated view angle of the driver in a known method. Therefore, the guidance output reference position can be determined based on the correction distance in accordance with the physical type of the driver and the seat position of the vehicle 2. Thereby, it is possible to provide guidance to the driver at a more appropriate time.

In addition, in the third embodiment, it was explained that the correction distance information corresponding to the travel speed of the vehicle 2 was stored in the correction distance table 80b. However, it is only necessary that the correction distance table 80b stores the correction distance information according to a parameter that makes influence on the view angle of the driver. For example, the correction distance information according to the travel environment such as cloudy weather, rainy weather, fog, and the like, the correction distance information according to a movement range of a windshield wiper per a predetermined time, or the like may be stored. In such case, in the processing at SC8, the controller 70 can acquire the abovementioned travel environment or the movement range of the windshield wiper in a known method as needed, acquire the correction distance corresponding to the acquired travel environment or movement range of the windshield wiper from the correction distance table 80b, and perform the processing in the same manner as the above based on the acquired correction distance information.

(Guidance Processing)

In the first embodiment, in the processing at SA12, it was explained that the guidance part 70g outputted the guidance regarding the travel with the speaker 50. However, the guidance regarding the travel may be outputted through the display 60.

In addition, in the first embodiment, in the processing at SA12, it was explained that the guidance part 70g provided the guidance regarding the travel at the guidance output reference position. However, it is only necessary that the guidance is outputted at a predetermined position having the guidance output reference position determined at SA9 as a reference. The guidance part 70g may provide the guidance regarding the travel at the position where the vehicle 2 has arrived after traveling by a predetermined distance from the guidance output reference position (for example, at the position after the vehicle 2 has passed through the traffic light).

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A navigation device comprising:
    an image acquiring unit that acquires an image from an image-capturing unit, which is mounted in a vehicle to capture an image of a feature on a road;
    a correction distance storing unit that stores a correction distance to correct a difference between a first vehicle position, which is a position of the vehicle when the feature disappears from an imaging area of the image-capturing unit, and a second vehicle position, which is a position of the vehicle when the feature disappears from a driver's view, the correction distance being along a travel direction of the vehicle;
    a judging unit that judges based on the image acquired by the image acquiring unit and the correction distance stored in the correction distance storing unit whether the vehicle has arrived at the second vehicle position; and
    a guidance unit that, if the judging unit has judged that the vehicle has arrived at the second vehicle position, provides guidance regarding the feature at a predetermined position having the second vehicle position as a reference.

2. The navigation device according to claim 1, wherein
    the correction distance is a distance from the second vehicle position to a position of the feature, and
    the judging unit determines the position of the feature based on the image acquired by the image acquiring unit, and if the vehicle has arrived at a position by the correction distance before the determined position of the feature along the travel direction of the vehicle, judges that the vehicle has arrived at the second vehicle position.

3. The navigation device according to claim 1, wherein
    the correction distance is a distance from the first vehicle position to the second vehicle position, and
    the judging unit determines, based on the image acquired by the image acquiring unit, a position where the feature has disappeared from the imaging area of the image-capturing unit, and if the vehicle has arrived at a position by the correction distance ahead of the determined position along the travel direction of the vehicle, judges that the vehicle has arrived at the second vehicle position.

4. The navigation device according to claim 1, wherein
    the correction distance storing unit stores the correction distance according to a travel speed of the vehicle, and
    the judging unit determines the travel speed of the vehicle in a predetermined method, acquires the correction distance according to the determined travel speed from the correction distance storing unit, and performs judgment based on the acquired correction distance.

5. The navigation device according to claim 2, wherein
    the correction distance storing unit stores the correction distance according to a travel speed of the vehicle, and
    the judging unit determines the travel speed of the vehicle in a predetermined method, acquires the correction distance according to the determined travel speed from the correction distance storing unit, and performs judgment based on the acquired correction distance.

6. The navigation device according to claim 3, wherein
    the correction distance storing unit stores the correction distance according to a travel speed of the vehicle, and
    the judging unit determines the travel speed of the vehicle in a predetermined method, acquires the correction distance according to the determined travel speed from the correction distance storing unit, and performs judgment based on the acquired correction distance.

7. A navigation method comprising the steps of:
    storing, in a storing unit, a correction distance to correct a difference between a first vehicle position, which is a position of a vehicle when a feature disappears from an imaging area of an image-capturing unit mounted in the vehicle to capture an image of the feature on a road, and a second vehicle position, which is a position of the vehicle when the feature disappears from a driver's view, the correction distance being along a travel direction of the vehicle;
    acquiring the image captured by the image-capturing unit;
    judging based on the image acquired at the image acquiring step and the correction distance acquired from the storing unit whether the vehicle has arrived at the second vehicle position; and
    if it has been judged at the judging step that the vehicle has arrived at the second vehicle position, providing guidance regarding the feature at a predetermined position having the second vehicle position as a reference.

8. The navigation method according to claim 7, further comprising:
    determining the position of the feature based on the image acquired by the image acquiring unit, and if the vehicle has arrived at a position by the correction distance before the determined position of the feature along the travel direction of the vehicle, judging that the vehicle has arrived at the second vehicle position,
    wherein the correction distance is a distance from the second vehicle position to a position of the feature.

9. The navigation method according to claim 7, further comprising:
    determining, based on the image acquired by the image acquiring unit, a position where the feature has disappeared from the imaging area of the image-capturing unit, and if the vehicle has arrived at a position by the correction distance ahead of the determined position along the travel direction of the vehicle, judging that the vehicle has arrived at the second vehicle position,
    wherein the correction distance is a distance from the first vehicle position to the second vehicle position.

10. The navigation method according to claim 7, further comprising:

determining the travel speed of the vehicle in a predetermined method, acquiring the correction distance according to the determined travel speed from the correction distance storing unit, and performing judgment based on the acquired correction distance, wherein the correction distance storing unit stores the correction distance according to a travel speed of the vehicle.

11. A navigation program causing a computer to execute the method of claim 7.

* * * * *